(12) United States Patent
Le

(10) Patent No.: US 11,331,662 B2
(45) Date of Patent: May 17, 2022

(54) ASSAY PREPARATION DEVICE

(71) Applicant: Miraplex Diagnostics Inc., San Leandro, CA (US)

(72) Inventor: Loan T. Le, San Leandro, CA (US)

(73) Assignee: MIRAPLEX DIAGNOSTICS INC., San Leandro, CA (US)

( * ) Notice: Subject to any disclaimer, the term of this patent is extended or adjusted under 35 U.S.C. 154(b) by 276 days.

(21) Appl. No.: 16/648,208

(22) PCT Filed: Oct. 1, 2018

(86) PCT No.: PCT/IB2018/057623
§ 371 (c)(1),
(2) Date: Mar. 17, 2020

(87) PCT Pub. No.: WO2019/064289
PCT Pub. Date: Apr. 4, 2019

(65) Prior Publication Data
US 2020/0215535 A1     Jul. 9, 2020

Related U.S. Application Data

(60) Provisional application No. 62/566,065, filed on Sep. 29, 2017.

(51) Int. Cl.
*B01L 3/00*     (2006.01)
*G01N 1/28*     (2006.01)

(52) U.S. Cl.
CPC ............ *B01L 3/5027* (2013.01); *G01N 1/286* (2013.01); *B01L 2300/0867* (2013.01); *B01L 2400/0644* (2013.01)

(58) Field of Classification Search
CPC combination set(s) only.
See application file for complete search history.

(56) References Cited

U.S. PATENT DOCUMENTS

| 8,523,797 B2 | 9/2013 | Lowery |
| D800,912 S | 10/2017 | Uzri |
| 2002/0106661 A1 | 8/2002 | Virtanen |
| 2004/0228766 A1 | 11/2004 | Witty |

(Continued)

FOREIGN PATENT DOCUMENTS

WO    WO2013049782 A2    4/2013

*Primary Examiner* — Samuel P Siefke
*Assistant Examiner* — Tingchen Shi

(57) ABSTRACT

An assay preparation device is an apparatus that is used to contain a variety of reagents and samples, to combine these fluids in a desirable order, to agitate the fluids through rotation of adsorbent petals, to contain the resulting waste products, and to allow for wavelength analysis of the results. The apparatus includes a reaction chamber, an intake port, a sample-retaining spinner, a first reading slit, a plurality of fluid-retaining receptacles, a plurality of input valves, and a waste valve. The plurality of input valves is connected to the plurality of fluid-retaining receptacles, allowing the user to control fluid flow into the reaction chamber. The sample-retaining spinner collects the fluids in the reaction chamber. Upon reaction completion, the waste valve is opened to allow for removal of fluids from the reaction chamber. The first reading slit provides a window for wavelength examination tools to examine and analyze the reaction results.

13 Claims, 5 Drawing Sheets

(56) References Cited

U.S. PATENT DOCUMENTS

| | | |
|---|---|---|
| 2012/0325334 A1* | 12/2012 | De Gier ............ B01L 3/502738 |
| | | 137/561 A |
| 2013/0004964 A1 | 1/2013 | Boehm et al. |
| 2014/0023568 A1* | 1/2014 | Hong .................... B01F 33/452 |
| | | 422/546 |
| 2014/0200154 A1 | 7/2014 | Sugarman |
| 2015/0377901 A1 | 12/2015 | Ghatak |
| 2016/0025639 A1 | 1/2016 | Jakubowicz |
| 2016/0069916 A1 | 3/2016 | Loo et al. |
| 2016/0130640 A1* | 5/2016 | Wright ................ B01F 27/0721 |
| | | 435/306.1 |
| 2018/0299473 A1 | 10/2018 | Chou |

* cited by examiner

ASSAY PREPARATION DEVICE

The current application is a 371 of international Patent Cooperation Treaty (PCT) application PCT/US2018/057623 filed on Oct. 1, 2018. The PCT application PCT/US2018/057623 claims a priority to a U.S. provisional application Ser. No. 62/566,065 filed on Sep. 29, 2017.

FIELD OF THE INVENTION

The present invention generally relates to a reaction-inducing container. More specifically, the present invention is a device that allows multiplexing of many biomarkers in one reaction from one sample. A rotating capture platform enables capture and preparation of test samples, and access slots enable signal detection devices to analyze reaction results. The present invention allows different matrices from one end to enter reaction chamber and exit separately and as needed.

BACKGROUND OF THE INVENTION

Point of care testing (POCT) is useful in medical facilities for gathering data and performing analyses on the spot, as opposed to waiting for laboratory results. Among the useful data to be acquired is the presence or absence of specific proteins and compounds, as well as the relative quantities of such proteins. Most of the current POCT addressing this process use a quick lateral-flow immuno-precipitation method to qualitatively identify the presence of an individual biomarker. Currently, in centralized laboratories, in order to acquire more useful quantitative values from samples, high quality testing is performed on automated instruments. Unfortunately, these solutions are too expensive for many laboratories and do not answer the accessibility issue due to requirements of supporting infrastructures and extensive training on highly experienced specialist.

Recently, multiplexing systems have been developed in attempt to increase efficiency and reduce cost for the system. However, these devices are still too expensive to be owned by smaller establishments, often costing up to $100,000, and still require extensive training and highly experienced specialists to operate. On top of this, long turn-around time and mismanagement of laboratory testing also causes issues for patients, who have to come back to the doctors for results. What is needed is a new and disruptive POCT technology that is portable, versatile, and capable of providing quantitative analysis of biomarkers with accuracy, sensitivity and specificity. Further useful is a device designed with emphasis on cost reduction and personalized care.

The present invention addresses these issues. The present invention is a container that holds multiple vials of sample fluids, reagents, washing buffers of types, and more. External vials are attached to the present invention through several vial holders on top of the present invention. Fluids in these vials are manually pushed into reaction chambers, either individually or in combination. The flow of these fluids from external vials is controlled by a series of corresponding valves. The reaction chamber contains a spinning housing for many reaction surfaces, or petals, which may each be different shapes and sizes. When fluids have been added to the reaction chamber containing the spinner, the spinner is then manually rotated for an intended period. In some embodiments, this rotation is induced using magnetic tools. A vent within the reaction chamber could serve as either an exhaust or an inlet to allow for pressure management. Upon reaction completion, a valve may be actuated to control flow from the reaction chamber into the waste chamber. The waste chamber has an exhaust that facilitates positive flow into the waste chamber without creating pressure inside waste chamber. A slit on the front and the back of the present invention allows wavelength reading and subsequent analysis to occur through the use of external wavelength measuring devices.

DETAILED DESCRIPTION OF THE INVENTION

All illustrations of the drawings are for the purpose of describing selected versions of the present invention and are not intended to limit the scope of the present invention.

Figure 3:
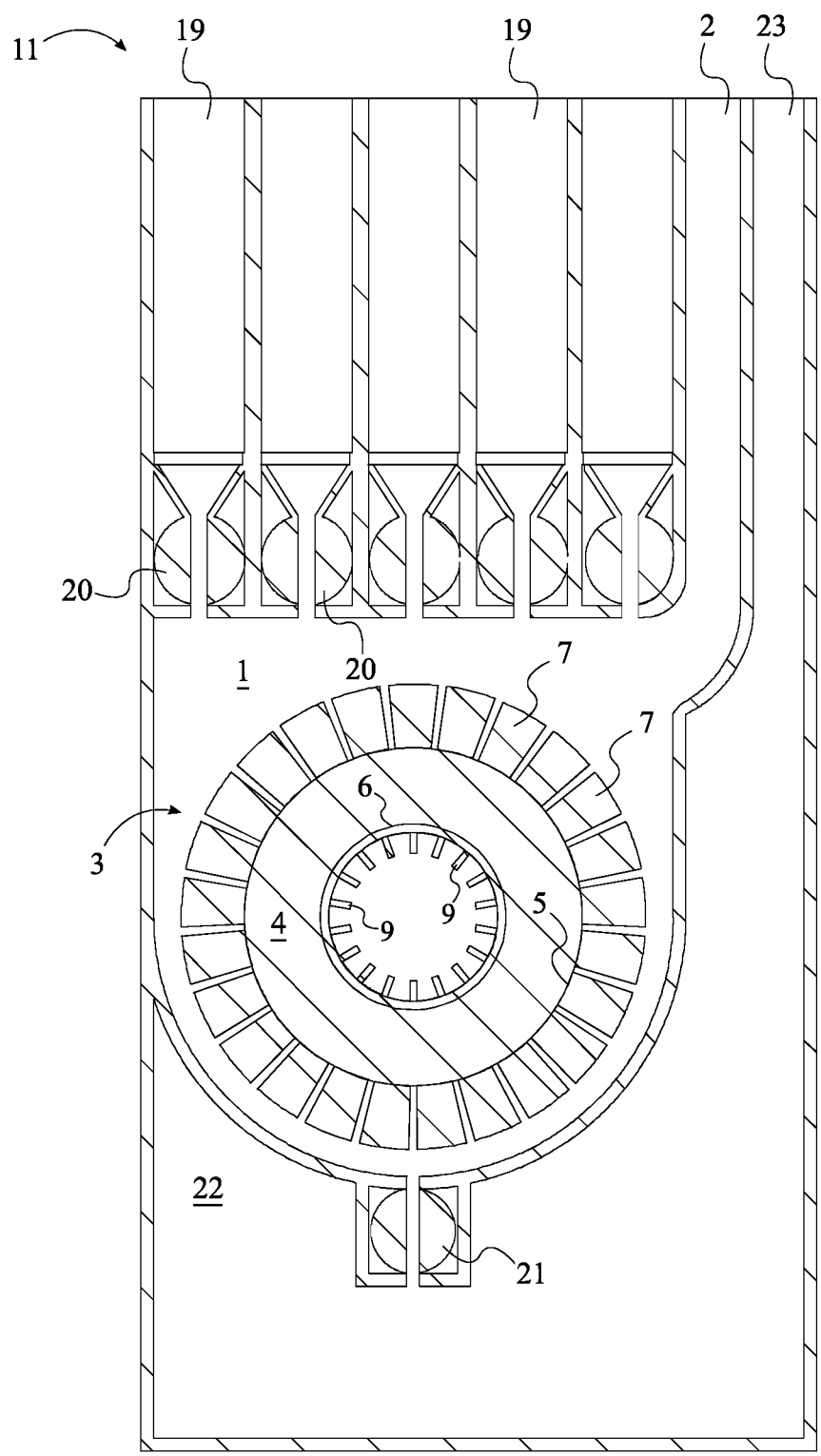
FIG. 3 is a front cross-sectional view present invention.

The present invention relates generally to an apparatus used to contain a variety of reagents and samples, to combine these fluids in a desirable order, to agitate the fluids through rotation of adsorbent surfaces, to contain the resulting waste products, and to allow for wavelength analysis of the results. The present invention is further configured to allow for the use of suction and pressure-manipulating devices, such as pumps, to control the internal flow of fluids and the reaction processes that occur. The present invention comprises a reaction chamber 1, an intake port 2, a sample-retaining spinner 3, a first reading slit 10, a plurality of fluid-retaining receptacles 11, a plurality of input valves 20, and a waste valve 21, as seen in FIG. 3. The reaction chamber 1 is the primary space in which the reactions and chemical processes take place. The intake port 2 is an opening that allows for the addition of fluidic pressure to the reaction chamber 1, either as a means of facilitating reactions or as a means of facilitating pressure flow through the waste valve 21. The sample-retaining spinner 3 is a mechanism that allows for connection of various biomarker-collection surfaces and subsequent rotation of those surfaces within the reaction chamber 1. The first reading slit 10 is an opening in the present invention that allows for analysis of proteins captured upon the sample-retaining spinner 3. The plurality of fluid-retaining receptacles 11 is a set of openings that provides access points for various fluids to enter the reaction chamber 1. The plurality of input valves 20 is a set of flow regulators that allows for control over the flow rate of fluids from the plurality of fluid-retaining receptacles 11 to the reaction chamber 1. Similarly, the waste valve 21 is a flow regulator that allows for control over the flow rate of fluids out of the reaction chamber 1.

Figure 4:
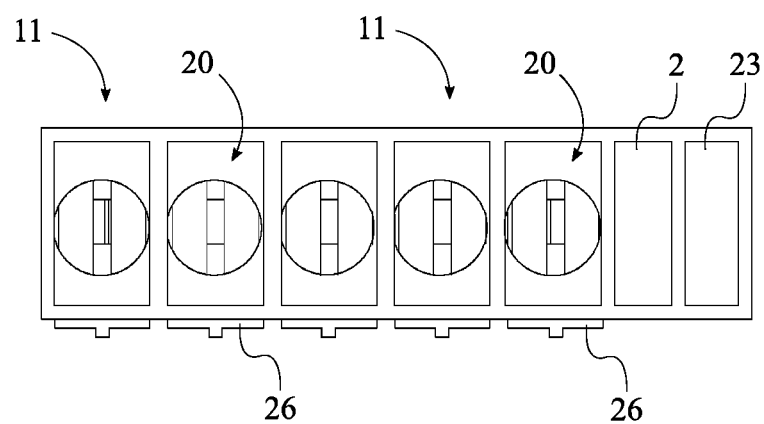
FIG. 4 is a top view of the present invention.

The general configuration of the aforementioned components allows the present invention to efficiently and effectively contain and process chemical reactions and to prepare the results for subsequent analysis. The plurality of input valves 20, the waste valve 21, and the intake port 2 are integrated into the reaction chamber 1. This arrangement allows the plurality of input valves 20, the waste valve 21, and the intake port 2 to control fluid flow through the reaction chamber 1. The sample-retaining spinner 3 is rotatably mounted within the reaction chamber 1. In this way, the sample-retaining spinner 3 is capable of spinning in order to generate reaction-inducing turbulence within the reaction chamber 1, and to improve surface adhesion of reagents onto the sample-retaining spinner 3. The plurality of input valves 20 is serially positioned to each other. This arrangement allows for intuitive positioning of the plurality of input valves 20 within the present invention. The plurality of input valves 20 and the waste valve 21 are positioned opposite to each other about the sample-retaining spinner 3. In this arrangement, the flow of fluids through the present invention requires that the reagents pass over or around the sample-retaining spinner 3. Further, the intake port 2 is positioned adjacent to the plurality of input valves 20, as seen in FIG. 4. In this way, fluids that enter the reaction chamber 1 may immediately experience pressure changes controlled by the intake port 2. Each of the plurality of fluid-retaining receptacles 11 is hermetically coupled to a corresponding valve from the plurality of input valves 20. This arrangement enables creation of a relatively closed system, which enables better control over environmental variables during reactions in the reaction chamber 1. The first reading slit 10 traverses into the reaction chamber 1, parallel to a rotation axis of the sample-retaining spinner 3. Further, the first reading slit 10 is peripherally positioned to the sample-retaining spinner 3. This arrangement allows for a signal-reading device such as a spectrum reader to capture reaction results as made available upon the sample-retaining spinner 3.

The present invention is further equipped to manage and contain waste byproducts created during the reactions and the washing process. To this end, the present invention comprises a waste chamber 22. The waste chamber 22 is a space capable of storing a volume of used reagent and fluids. The waste chamber 22 is positioned adjacent to the waste valve 21, as seen in FIG. 3. In this way, fluid enters the waste chamber 22 by controlling the waste valve 21. The reaction chamber 1 is in fluid communication with the waste chamber 22 through the waste valve 21. This arrangement allows for the waste valve 21 to control the flow of fluids from the reaction chamber 1 into the waste chamber 22.

Fluid being forced through the waste valve 21 may create pressure problems that could be potentially harmful to the integrity of present invention. To address this potential issue, the present invention comprises an exhaust port 23, seen in FIG. 1. The exhaust port 23 is a channel that allows for gases to escape from the present invention. The exhaust port 23 is positioned adjacent to the intake port 2, opposite the plurality of input valves 20. This arrangement results in the components related to pressure-adjustment being positioned intuitively adjacent to each other. The exhaust port 23 is in fluid communication with the waste chamber 22. This arrangement ensures that the waste chamber 22 does not retain an undue amount of pressure.

Figure 2:
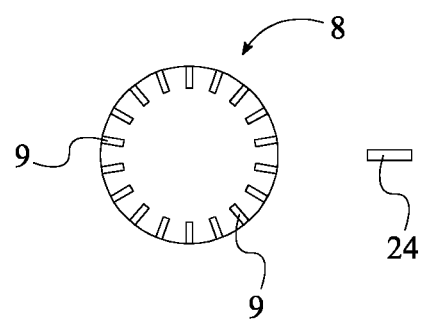
FIG. 2 is a back view of the present invention.

It may be advantageous for the user to have multiple openings capable of being utilized for subsequent analysis. To this end, the present invention comprises a second reading slit 24, as seen in FIG. 2. The second reading slit 24 is an opening that enables emission of wavelengths of detectable light, which are used for subsequent analysis. The second reading slit 24 traverses into the reaction chamber 1, opposite the first reading slit 10. This arrangement positions the second reading slit 24 on the opposite side of the present invention as the first reading slit 10, thus potentially providing a more convenient means of analysis. The second reading slit 24 is positioned colinear to the first reading slit 10. In this way, the second reading slit 24 is configured to collect identical results to the first reading slit 10.

The physical integrity of the reaction chamber 1 may also suffer due to the effects of excessive internal pressure. To allay this concern, the present invention comprises a pressure relief vent 25, seen in FIG. 1. The pressure relief vent 25 is an opening that allows pressure to exit the reaction chamber 1. The pressure relief vent 25 traverses into the reaction chamber 1. This allows the pressure relief vent 25 to expel any built-up gases within the reaction chamber 1, thus preventing damage due to internal pressure.

In order to capture samples, the sample-retaining spinner 3 must be prepared to capture various samples. Therefore, the sample-retaining spinner 3 comprises an annular hub 4, a plurality of petals 7, and an access opening 8, as seen in FIG. 3. The annular hub 4 is a generally ring-shaped support. The plurality of petals 7 is a series of solid surfaces of a variety of different shapes and sizes capable of capturing various chemicals and fluids upon its surface. The access opening 8 is a cut into the reaction chamber 1 that allows for user interaction with the sample-retaining spinner 3. The annular hub 4 comprises an outer surface 5. The outer surface 5 is the surface facing away from the access opening 8. The annular hub 4 is rotatably connected within the reaction chamber 1. This allows the annular hub 4 to spin during use of the present invention. The plurality of petals 7 is radially attached around the outer surface 5. This arrangement positions the plurality of petals 7 so that fluids are evenly distributed onto the plurality of petals 7 within the reaction chamber 1. The access opening 8 traverses into the reaction chamber 1, adjacent to the annular hub 4. This way, the access opening 8 provides access for the user to interact with the sample-retaining spinner 3. Furthermore, in an alternative embodiment, the annular hub 4 is made of a magnetic material. This enables magnetic coupling between the sample-retaining spinner 3 and a rotor of a motor, which allows the rotor to drive the rotation of the sample-retaining spinner 3.

Furthermore, the sample-retaining spinner 3 further comprises a plurality of teeth 9. The plurality of teeth 9 is a circular pattern of solid extrusions. The annular hub 4 further comprises an inner surface 6. The inner surface 6 is the surface opposite the outer surface 5 that allows for user engagement with the annular hub 4, as seen in FIG. 3. The plurality of teeth 9 is radially attached within the inner surface 6. This arrangement allows the plurality of teeth 9 to provide the user with a means for spinning or rotating the sample-retaining spinner 3 during use.

Figure 1:
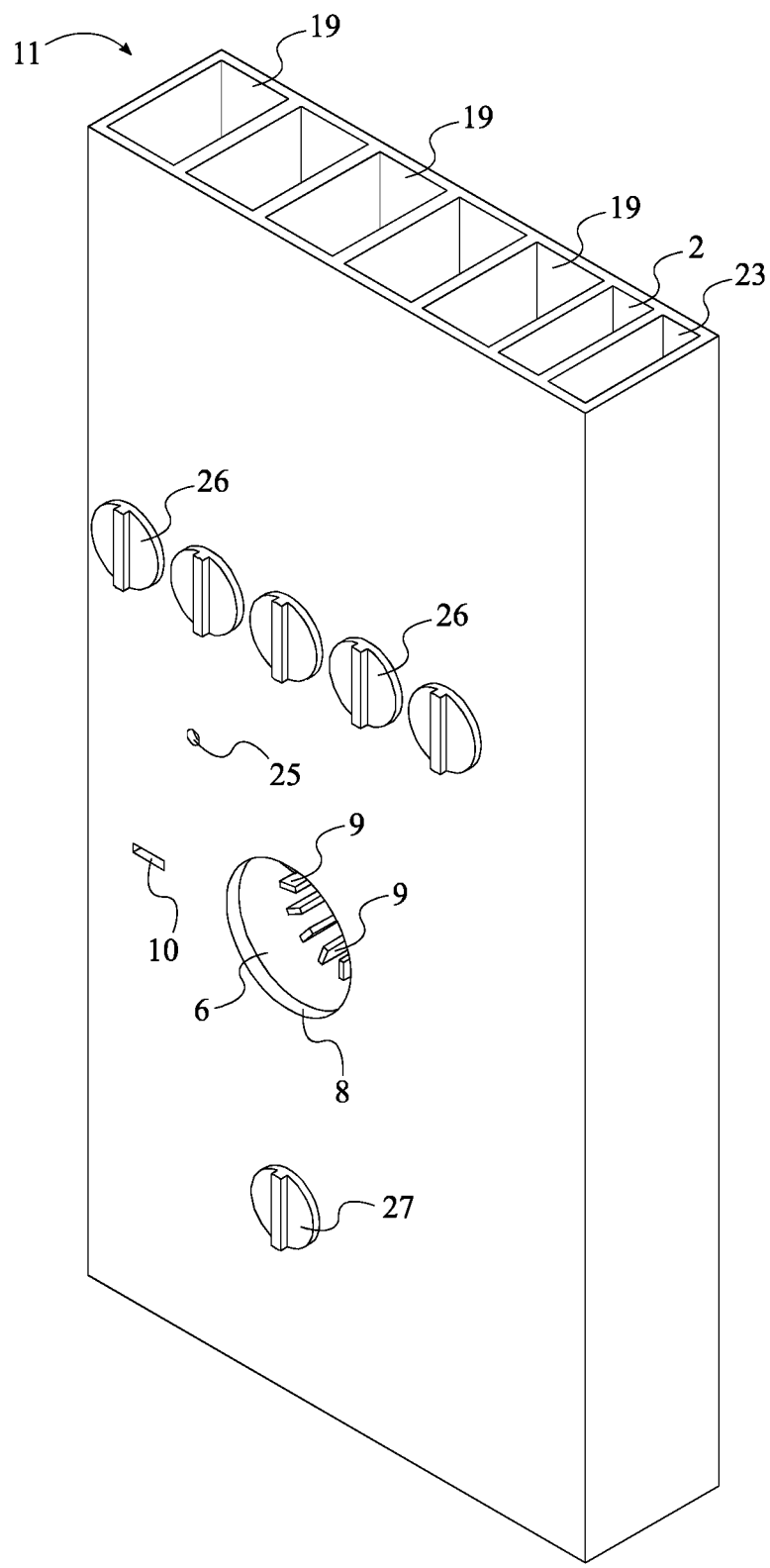
FIG. 1 is a front-top perspective view of the present invention.

In order to make appropriate usage of the present invention, the user requires access to the open/closed state of the plurality of input valves 20. To this end, the present invention comprises a plurality of input manual actuators 26, as seen in FIG. 1. The plurality of input manual actuators 26 is a set of solid extrusions that allow the user to toggle the open/closed state of the plurality of input valves 20. Each of the plurality of input manual actuators 26 is operatively coupled to the corresponding input valve, wherein each of the plurality of input manual actuators 26 is used to open or close its corresponding input valve. This arrangement gives the user control over the flow of fluids from the plurality of fluid-retaining receptacles 11. Furthermore, in order to operate the waste valve 21, the present invention further comprises a waste manual actuator 27. The waste manual actuator 27 is a solid extrusion that allows the user to toggle the open/closed state of the waste valve 21. The waste manual actuator 27 is operatively coupled to the waste valve 21, wherein the waste manual actuator 27 is used to open or close the waste valve 21. This arrangement gives the user control over the flow of fluids from the reaction chamber 1.

Figure 5:
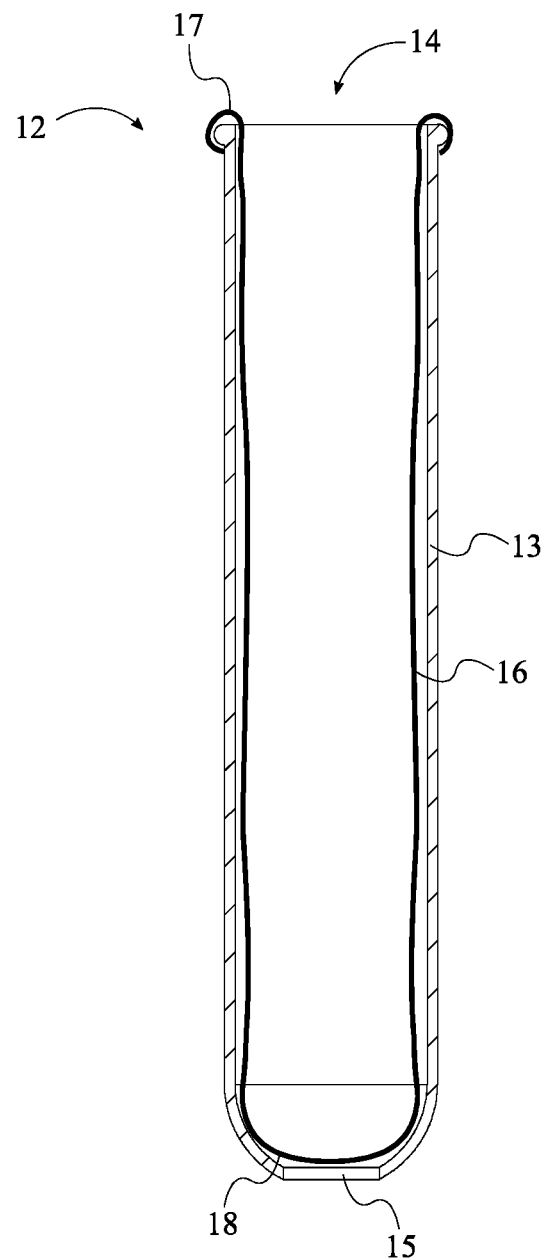
FIG. 5 is a front cross-sectional view of a fluid-delivery device.

The present invention requires a mechanism for accepting various fluids. To this end, each of the plurality of fluid-retaining receptacles 11 comprises a fluid-delivery device 12 and a pipe 19. The fluid-delivery device 12, seen in FIG. 5, is a container that allows for support of fluids to be utilized in a reaction. The pipe 19 is an elongated rigid unit that extends from the plurality of input valves 20. The fluid-delivery device 12 is in fluid communication with the corresponding input valve through the pipe 19. This arrangement ensures that the user is not in danger of becoming contaminated by reagents or dangerous material during use.

In an exemplary embodiment, the fluid-delivery device 12 comprises a tube 13 and an elongated bag 16. The tube 13 is a hollow extrusion capable of structurally supporting the elongated bag 16. The elongated bag 16 is a flexible surface that contains various fluids before usage. The tube 13 comprises a first open end 14 and a second open end 15. The first open end 14 is positioned opposite the second open end 15 along the tube 13. The elongated bag 16 comprises a rim 17 and a base 18. The rim 17 is an opening that allows for the addition of items into the elongated bag 16. The base 18 is the container in which fluids are supported prior to their injection into the reaction chamber 1. The elongated bag 16 is positioned within the tube 13. The arrangement of components seen in FIG. 5 enables structural support of the bag during filling. The rim 17 is connected around the first open end 14. Further, the base 18 is positioned adjacent to the second open end 15. This arrangement allows fluids to easily enter the elongated bag 16 and be volumetrically-contained by the tube 13. The first open end 14 is hermetically connected to the pipe 19. In this way, the contents of the elongated bag 16 cannot contact the pipe 19. This arrangement enables the user to pressurize the base 18 by pressing, in order to force fluid through the corresponding input valve of the plurality of input valves 20.

In an exemplary embodiment, the fluid-delivery device 12 seen in FIG. 5 is threadably and terminally engaged to the pipe 19. This arrangement enables other mechanisms, such as threaded syringes, to engage with the pipe 19 for subsequent transmission of contained fluids.

In the preferred usage of the present invention, the present invention can serve as a platform to carry out an immunoassay that utilizes a two-step assay format with two washes. In immunoassays, a capture reagent has proteomics bound to a surface that can capture other proteomics called biomarkers. The detection reagent is a solution that holds proteomics with one end conjugated to a fluorescence dye and the other end bound to the biomarkers. The sample is an aqueous medium that could be serum, plasma, bodily secretion, urine or anything else that contains biomarkers. A wash buffer is a solution that is used to washed unbound or unwanted materials away. Firstly, each fluid-delivery device 12 holds one of: the sample, the detection reagent, two wash buffers, and a final solution. The input valve of the plurality of input valves 20 controlling flow of sample is opened. The sample is first pumped into the reaction chamber 1 by pressing the base 18 towards the first open end 14. Inside the reaction chamber 1, the plurality of petals 7 start to capture biomarkers present in sample. At this point, the sample-retaining spinner 3 is spun by external manipulation of the annular hub 4 to better enhance capturing of biomarker. The waste valve 21 opens and the sample is forced out. The waste valve 21 then closes. Next, the valve of the plurality of input valves 20 controlling the wash buffer is open. The wash buffer washes out any remnant of sample that is still stuck inside of the reaction chamber 1. The sample-retaining spinner 3 continues to spin. The wash buffer is then forced out by positive pressure after the waste valve 21 opens. The detection reagent is then allowed to enter the reaction chamber 1 after the corresponding valve of the plurality of input valves 20 is opened. The detection reagent binds to biomarkers that have been bound to the plurality of petals 7. The waste valve 21 opens once again. The detection reagent is sent into the waste chamber 22, along with the waste from the previous fluids. The second wash buffer is then allowed in upon operation of the corresponding valve of the plurality of input valves 20 to wash away unbound detection reagent. The wash buffer enters the waste chamber 21 through the waste valve 20. The final solution then enters the reaction chamber 1. At this point, the plurality of petals 7 contain only complexes of capture-biomarker-detection-tagged dye. A wavelength reader is needed to excite the dye and detect the emission wavelength from the excited dye.

Although the invention has been explained in relation to its preferred embodiment, it is to be understood that many other possible modifications and variations can be made without departing from the spirit and scope of the invention as hereinafter claimed.

What is claimed is:

1. An assay preparation device comprises:
   a reaction chamber;
   an intake port;
   a sample-retaining spinner;
   a first reading slit;
   a plurality of fluid-retaining receptacles;
   a plurality of input valves;
   a waste valve;
   the plurality of input valves, the waste valve, and the intake port being integrated into the reaction chamber;
   the sample-retaining spinner being rotatably mounted within the reaction chamber;
   the plurality of input valves being serially positioned to each other;
   the plurality of input valves and the waste valve being positioned opposite to each other about the sample-retaining spinner;
   the intake port being positioned adjacent to the plurality of input valves;
   each of the plurality of fluid-retaining receptacles being hermetically coupled to a corresponding input valve from the plurality of input valves;
   the first reading slit traversing into the reaction chamber, parallel to a rotation axis of the sample-retaining spinner; and
   the first reading slit being peripherally positioned to the sample-retaining spinner.

2. The assay preparation device as claimed in claim 1 comprises:
   a waste chamber;
   the waste chamber being positioned adjacent to the waste valve; and
   the reaction chamber being in fluid communication with the waste chamber through the waste valve.

3. The assay preparation device as claimed in claim 2 comprises:
   an exhaust port;
   the exhaust port being positioned adjacent to the intake port, opposite the plurality of input valves; and
   the exhaust port being in fluid communication with the waste chamber.

4. The assay preparation device as claimed in claim 1 comprises:
   a second reading slit;
   the second reading slit traversing into the reaction chamber, opposite the first reading slit; and the second reading slit being positioned colinear to the first reading slit.

5. The assay preparation device as claimed in claim 1 comprises:
   a pressure relief vent; and
   the pressure relief vent traversing into the reaction chamber.

6. The assay preparation device as claimed in claim 1 comprises:
   the sample-retaining spinner comprises an annular hub, a plurality of petals, and an access opening;
   the annular hub comprises an outer surface;
   the annular hub being rotatably connected within the reaction chamber;
   the plurality of petals being radially attached around the outer surface; and
   the access opening traversing into the reaction chamber, adjacent to the annular hub.

7. The assay preparation device as claimed in claim 6, wherein the annular hub is made of a magnetic material.

8. The assay preparation device as claimed in claim 6 comprises:
   the sample-retaining spinner further comprises a plurality of teeth;
   the annular hub further comprises an inner surface; and
   the plurality of teeth being radially attached within the inner surface.

9. The assay preparation device as claimed in claim 1 comprises:
   a plurality of input manual actuators; and
   each of the plurality of input manual actuators being operatively coupled to the corresponding input valve, wherein each of the plurality of input manual actuators is used to open or close the corresponding input valve.

10. The assay preparation device as claimed in claim 1 comprises:
    a waste manual actuator; and
    the waste manual actuator being operatively coupled to the waste valve, wherein the waste manual actuator is used to open or close the waste valve.

11. The assay preparation device as claimed in claim 1 comprises:
    each of the plurality of fluid-retaining receptacles comprises a fluid-delivery device and a pipe; and
    the fluid-delivery device being in fluid communication with the corresponding input valve through the pipe.

12. The assay preparation device as claimed in claim 11 comprises:
    the fluid-delivery device comprises a tube and an elongated bag;
    the tube comprises a first open end and a second open end;
    the elongated bag comprises a rim and a base;
    the elongated bag being positioned within the tube;
    the rim being connected around the first open end;
    the base being positioned adjacent to the second open end; and
    the first open end being hermetically connected to the pipe.

13. The assay preparation device as claimed in claim 11 comprises:
    the fluid-delivery device being threadably and terminally engaged to the pipe.

\* \* \* \* \*